US010431022B2

United States Patent
Koenig et al.

(10) Patent No.: US 10,431,022 B2
(45) Date of Patent: Oct. 1, 2019

(54) CUSTOMIZED FUEL RECOMMENDATIONS (71) Applicant: ExxonMobil Research and Engineering Company, Annandale, NJ (US)

(72) Inventors: Leonard R. Koenig, Jobstown, NJ (US); Paul J. Berlowitz, Glen Gardner, NJ (US); Gregory K. Lilik, Media, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 61 days.

(21) Appl. No.: 15/454,039

(22) Filed: Mar. 9, 2017

(65) Prior Publication Data
US 2017/0287237 A1 Oct. 5, 2017

Related U.S. Application Data (60) Provisional application No. 62/314,438, filed on Mar. 29, 2016.

(51) Int. Cl.
*G07C 5/08* (2006.01)
*G07C 5/00* (2006.01)
(Continued)

(52) U.S. Cl.
CPC ....... *G07C 5/0808* (2013.01); *G06Q 30/0282* (2013.01); *G07C 5/008* (2013.01);
(Continued)

(58) Field of Classification Search
CPC .... G07C 5/0808; G07C 5/008; G07C 5/0841; B67D 7/04; H04L 67/10
(Continued)

(56) References Cited

U.S. PATENT DOCUMENTS 6,405,106 B1   6/2002 Sheth et al.
8,315,788 B2  11/2012 Surnilla et al.
(Continued)

FOREIGN PATENT DOCUMENTS

CN    202049381 U    11/2011
DE   102009040722 A1   7/2011
(Continued)

OTHER PUBLICATIONS

465096, RD, A, Jan. 10, 2003, Inc G.
(Continued)

*Primary Examiner* — Gertrude Arthur Jeanglaude
(74) *Attorney, Agent, or Firm* — Anthony G. Boone (57) ABSTRACT

A system for providing fuel type recommendations includes a mobile polling device communicatively coupled to one or more computing devices installed on-board of a vehicle for receiving vehicle's operational data from the on-board computing devices. The system further includes a cloud-based computing environment including a memory configured to store one or more processes and a processor adapted to execute the one or more processes using the cloud-based computing environment. The processor, when executing the one or more processes, is operable to receive vehicle's operational data from the mobile polling device. The processor is further operable to analyze the received vehicle's operational data to identify recommended fuel type and to provide one or more fuel type recommendations indicative of the recommended fuel type.

20 Claims, 6 Drawing Sheets

(51) Int. Cl.
  *G06Q 30/02* (2012.01)
  *B67D 7/04* (2010.01)
  *H04L 29/08* (2006.01)
(52) U.S. Cl.
  CPC .............. *G07C 5/0841* (2013.01); *B67D 7/04* (2013.01); *H04L 67/10* (2013.01)
(58) Field of Classification Search
  USPC .................................................. 701/31.4, 36
  See application file for complete search history.

(56) References Cited

U.S. PATENT DOCUMENTS

| | | |
|---|---|---|
| 2003/0025600 A1 | 2/2003 | Blanchard |
| 2003/0028285 A1* | 2/2003 | Zura ...................... G06Q 10/08 700/241 |
| 2010/0153207 A1 | 6/2010 | Roberts et al. |
| 2012/0197460 A1 | 8/2012 | Seymour et al. |
| 2013/0275013 A1* | 10/2013 | Kote ...................... G07C 5/008 701/51 |
| 2014/0172179 A1 | 6/2014 | Baudin, Jr. et al. |

FOREIGN PATENT DOCUMENTS

| | | |
|---|---|---|
| JP | 2008260541 A | 10/2008 |
| JP | 2009024569 A | 2/2009 |
| KR | 2014078775 A | 6/2014 |
| RU | 2361278 C2 | 7/2009 |
| WO | 8901571 A1 | 2/1989 |
| WO | 200077620 A2 | 12/2000 |
| WO | 200103983 A1 | 1/2001 |
| WO | 2008069625 A1 | 6/2008 |
| WO | 2009092473 A1 | 7/2009 |
| WO | 2016012897 A1 | 1/2016 |

OTHER PUBLICATIONS

581009, RD, A, Sep. 10, 2012, Anonymous.
Ayala et al., "Effects of combustion phasing, relative air-fuel ratio, compression ratio, and load on SI engine efficiency", SAE International, Apr. 3, 2006, SAE Paper 2006-01-0229, Transactions, 115, Journal of Engines, Section 3.
International Search Report and Written Opinion PCT/US2017/021705 dated May 9, 2017.

* cited by examiner

CUSTOMIZED FUEL RECOMMENDATIONS

CROSS-REFERENCE TO RELATED APPLICATIONS

This application claims the benefit of U.S. Provisional Application No. 62/314,438, filed on Mar. 29, 2016, the entire contents of which are incorporated herein by reference

FIELD

This disclosure relates generally to purchasing fuel, and more particularly to providing customized fuel recommendations to users.

BACKGROUND

Information and interactive mobile services available to mobile vehicles are increasing due to the demand of mobile vehicle operators for services such as navigation assistance, directory assistance, vehicle maintenance assistance, roadside assistance, information services assistance and emergency assistance. Requests for many of these services occur when a vehicle is outside of a home region, for example, during personal travel or business trips to neighboring or distant cities. Presently, on-board diagnostic (OBD) systems are incorporated into all modern vehicles, and provide an electronic solution for controlling, diagnosing, and reporting the operating state of the vehicle.

Currently, automobile manufacturers provide the type of recommended fuel (minimum octane number) in owner's manuals for each model automobile. However, this recommendation typically falls short of providing optimal guidance to the owner for a number of reasons. For example, when an automobile is driven on hot, dry days, on hilly roads or is used to pull a trailer, the automobile requires a more knock resistant fuel than it would in ordinary driving. Also, vehicles supposedly identical in design and construction can have significant differences in their potential to knock (octane requirement). Moreover, octane requirements frequently increase with mileage as deposits accumulate and change with engine wear.

It is desired to provide improved fuel recommendations to vehicle owners.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for providing fuel type recommendations is described in which an illustrated embodiment includes a mobile polling device communicatively coupled to one or more computing devices installed on-board of a vehicle for receiving vehicle's operational data from the on-board computing devices. The system further includes a processor adapted to execute one or more processes. The processor, when executing the one or more processes, is operable to receive vehicle's operational data from the mobile polling device. The processor is further operable to analyze the received vehicle's operational data to identify recommended fuel type and to provide one or more fuel type recommendations indicative of the recommended fuel type.

In another aspect, a method for providing fuel type recommendations is provided, which includes receiving vehicle's operational data from one or more computing devices integrated with a vehicle. The received vehicle's operational data is analyzed to identify recommended fuel type. One or more fuel type recommendations are provided indicative of the recommended fuel type to a driver of the vehicle. The recommended fuel type is automatically dispensed into the vehicle responsive to receiving driver's approval of the recommended fuel type.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are preferably a software algorithm, program or code residing on computer useable medium having control logic for enabling execution on a machine having a computer processor. The machine typically includes memory storage configured to provide output from execution of the computer algorithm or program.

All numerical values within the detailed description and the claims herein are modified by "about" or "approximately" the indicated value, and take into account experimental error and variations that would be expected by a person having ordinary skill in the art.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Optimal engine performance typically requires a combination of conflicting requirements. High output (e.g., high torque, acceleration, power, or brake horsepower), efficiency (low fuel consumption or miles travelled per gallon) and low emissions (such as NOx and $CO_2$ emissions) are simultaneously desired, but not to the extent of damaging or otherwise degrading the engine, environment, and/or users. In other words, high engine performance should be within safety limits, efficiency should be balanced with the performance needs, such as rapidly merging into fast-moving traffic. The combination of these competing demands generally leads to a fuel recommendation of sub-optimal performance that is well within limits and based on some "average" or "typical" driving.

An engine operating condition (e.g., load, speed, air temperature, pressure, humidity, Brake Mean Effective Pressure (BMEP), boost, fuel/air ratio, ignition timing, injection timing, compression ratio, and the like) may affect performance. Within an operating condition, safe operation is typically associated with controlled combustion (e.g., from a combustion front ignited by a spark plug or a fuel injection). A "high output" operating condition often increases the likelihood of uncontrolled combustion, which may be damaging.

Knocking (or pinging, pinking, detonation), is a combustion event in which an uncontrolled explosion occurs within the cylinder. Typically knocking comprises an instantaneous, explosive ignition of a pocket of fuel/air mixture outside of the controlled combustion zone (e.g., ahead of the flame front). A local shockwave is created around the pocket and the cylinder pressure may rise sharply. In extreme cases, engine parts can be damaged or destroyed. There is a degree of variability associated with combustion, which may result in a range of "intensities" for a knocking event. A "low" or "mild" knock may not be harmful, while a "high" or "harsh" knock may cause damage. Knocking at least partially results from a stochastic or otherwise random influences on an otherwise normally operating engine. As such, engine operation typically yields a range of intensities of knocking events.

Substantially all newly manufactured motor vehicles including trucks, automobiles, motorcycles, and boats powered by spark ignited engines are equipped with an Electronic Control Unit (ECU) or similar automatic engine control components. The ECU controls the mixture ratio of fuel (typically gasoline or mixtures of gasoline and oxygenates) and oxygen at the fuel injectors or carburetor, as is present at the time of combustion in the cylinder chamber of the engine, and adjusts the engine ignition and possibly valve timing accordingly, to prevent high knocking events that can damage the engine. It is well understood that using knock resistant, high octane fuel will allow many modern vehicles to take advantage of more aggressive tuning and associated efficiency and performance benefits. The ratio of oxygen to gasoline at the time of ignition is called the stoichiometry of the mixture, which can vary depending on engine design. The ECU maintains this mixture stoichiometry by monitoring several key elements, fundamental to all combustion engines, i.e. exhaust gas temperature, exhaust oxygen levels, throttle position, rpm's, torque, power requirements, engine temperature, manifold absolute pressure (MAP), outside air temperature and humidity, as well as other factors. The combination of vehicle and engine can result in specific requirements for octane (fuel anti-knock rating) that depend on the fuel composition. A multitude of fuel compositions with varying boiling ranges are rated as regular gasoline (87 (RON+MON)/2). Older-calibrated vehicles originally designed to run on regular gasoline can develop performance robbing deposits ("octane requirement increase") that can be compensated by higher octane fuel.

In modern vehicles, the computer (ECU) includes a knock control system configured and operable to list for engine knocking, and adjust ("detune") the engine parameters (i.e., ignition timing, valve timing, etc.) according to a precise set of numbers loaded into a look-up table within the ECU, designed by the manufacturer of the vehicle. However, at least in some cases, when operating an engine and adjusting engine operation, the traditional knock control systems within ECUs may choose to sacrifice vehicle performance or efficiency, by "detuning" of the engine, to avoid dangerous knock events. This automatic detuning routine designed to adjust engine's operational parameters in order to prevent harm does not offer vehicle operators any information and/or feedback with respect to making choices in their fuel purchases to improve specific performance related parameters (i.e., efficiency, power, etc.).

Various embodiments of the present disclosure disclose a fuel recommendation system configured and operable to provide relevant information related to fuel products and fueling services that satisfy user-specified needs. Advantageously, by accepting system recommended products and/or customized fuel dispensing services, rather than OEM new vehicle octane recommendations, users can obtain various benefits such as, but not limited to, improved efficiency, prolonged vehicle life, potentially increased resale value of their vehicles and the like. Since the fuel recommendation system dynamically provides recommendations based on the performed real-time analysis of the vehicle operating data, environmental data, etc., the improved customized recommendations are provided to individuals based on their usage and driving patterns.

In one embodiment, the fuel-recommendation system analyzes the vehicle operational data in real-time under multiple conditions of speed and load to determine if using different fuel type would lead to improved performance.

The monitoring of vehicle performance parameters (the terms "vehicle performance parameters" and "vehicle operational data" will be used interchangeably and include: vehicle speed, vehicle location, engine speed, engine load, air temperature, and fuel use, noting that such parameters are exemplary and not limiting) is done in real-time, via a data analyzer module remote from the vehicle and optionally hosted by the cloud-based platform (where vehicle operational data is conveyed from the vehicle to the cloud-based platform in real-time). The term "real-time" as used herein and the claims that follow is not intended to imply the data is analyzed or transmitted instantaneously, rather the data is collected over a relatively short period of time (over a period of seconds or minutes), and analyzed (or transmitted to the remote computing device (i.e., cloud-based platform) on an ongoing basis and analyzed) in a compressed time frame, as opposed to storing the data at the vehicle or remotely for an extended period of time (hour or days) before analysis. In one embodiment, this real-time analysis may produce a relationship between fuel composition and vehicle performance parameters. This relationship may be presented to a user as part of relevant information related to recommended fuel products.

Figure 1:
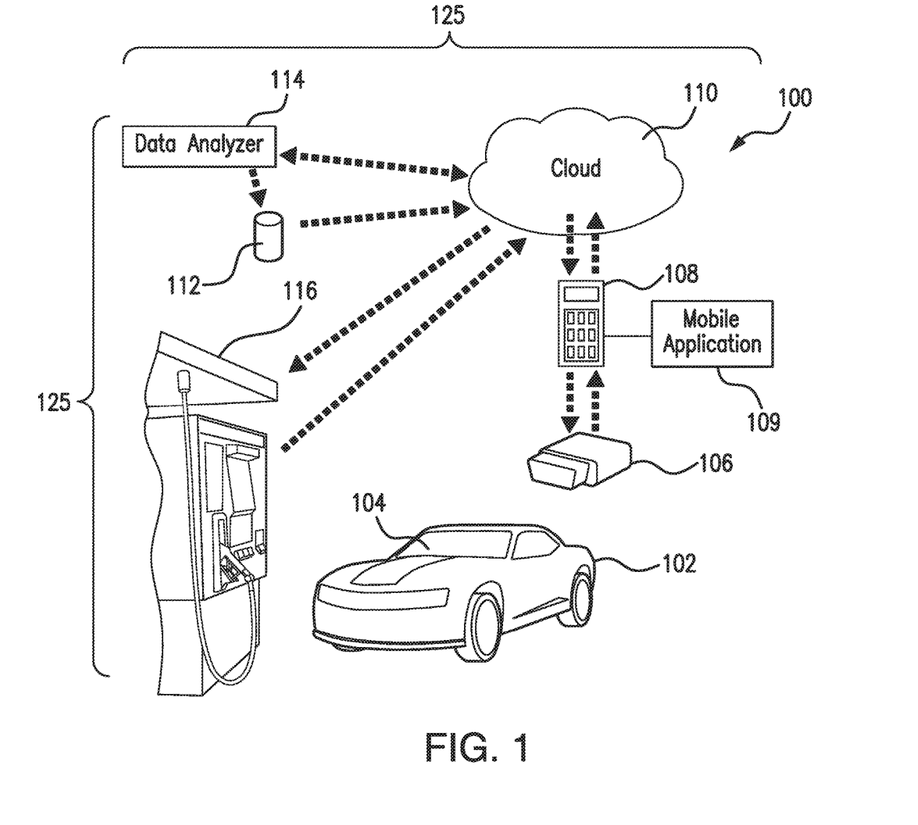
FIG. 1 illustrates a schematic diagram view of an exemplary fuel recommendation system constructed in accordance with embodiments of the present disclosure.

As noted above, the fuel recommendation system disclosed herein provides vehicle fuel recommendation services to a mobile application accessible at a customer's mobile device associated with a customer's vehicle or the vehicle's OBD. FIG. 1 is a schematic diagram view of an exemplary fuel recommendation system constructed in accordance with embodiments of the present disclosure. As shown, various devices communicate with each other and/or with a cloud based platform 125, discussed in greater detail below. One embodiment illustrated herein includes a method that may be practiced in a cloud-based computing environment.

Smart fueling techniques, which are optionally provided by the fuel recommendation system 100 create an environment that supports communication amongst the vehicle 102, a mobile polling device 106, an independent user computing device 108 (e.g., a mobile phone, tablet, computing device, wearable device, etc.), and a smart fuel dispenser 116. Notably, various communications options exist amongst each of these devices. For example, each of the vehicle 102, mobile polling device 106, customer device 108, and fuel dispenser 116 can communicate directly with each other and/or can communicate through the cloud 110.

Although fuel dispenser 116 is shown as a physical standalone fueling station, it is expressly contemplated that fuel dispenser 116 can be part of and communicate with a larger distributed fuel delivery system.

As discussed herein, the vehicle 102 includes vehicle telematics data either directly obtained from the vehicle telematics data infrastructure including one or more OBD systems and/or vehicle information and control systems 104 that generate telematics data, including vehicle diagnostic data. With respect to telematics data, generally telematics represents a mix of hardware and software telecommunications technology that conveys data or information for the purpose of improving business services or functions. In the automotive space, telematics has evolved to also include vehicle diagnostic data, vehicle performance data, global positioning satellite (GPS) data corresponding to the vehicle, support services data and the like.

In one embodiment, information related to a plurality of fuel products and fuel dispensing services may be provided by a cloud-based platform 125 storing service consumer's information as well as collected vehicle related data (i.e., vehicle operational data) in one or more databases 112. The cloud-based platform 125 may further include a telematics Application Programming Interface (API) (not shown in FIG. 1). The telematic API may include an Oauth API. OAuth is a protocol that allows applications developed by third-parties to access a service consumer's account. Within the OAuth workflow, the consumer/user is redirected from the mobile application 109 to an authentication endpoint for the cloud service, where the user provides authentication credentials and authorizes access by the mobile application 109. This process enables the third party application (i.e., mobile application 109) to access the vendor provided service (i.e., data analyzer 114) without requiring the user to share their authentication credentials with the mobile application 109. In an embodiment of the present disclosure, the data analyzer module 114 may be configured to analyze collected data related to vehicle performance in real-time and configured to provide an enhanced fuel type recommendation service and intended to achieve at least one of 1) maximized engine efficiency; 2) improved fuel economy; 3) improved vehicle performance depending on users preferences.

In one embodiment, an end user may request delivery of enhanced fuel recommendation service through the mobile application 109 running on the respective user computing device 108. The user computing device 108 could be a handheld computer, mobile Internet appliance, smartphone, connected vehicle, or any other mobile device that can be associated with end user's vehicle 102 and capable of receiving and processing fuel recommendation information.

The vehicle control system 104 shown in FIG. 1 includes at least one vehicle data port, which is typically an OBD-II port but may be other data ports. In the embodiment depicted in FIG. 1, a wireless interface connects the data port of the vehicle control system 104 to an intelligent mobile polling device 106. Further, in the embodiment depicted in FIG. 1, the computing device 108 is also wirelessly connected to the mobile polling device 106.

It is appreciated that even though the illustrated embodiment shows the data analyzer module 114 being hosted by the cloud-based platform 112, the data analyzer module 114 is equally adaptable to be hosted elsewhere. For example, in one embodiment, the data analyzer module 114 may run on the user computing device 108, while in yet another embodiment the data analyzer module 114 may be hosted by the vehicle control system 104.

The mobile polling device 106 may be any of a number of items, such as a specialized standalone transceiver, a laptop computer with specialized software and communications protocols loaded thereon, a specialized OBD-II dongle, or other specialized appliance.

Figure 2:
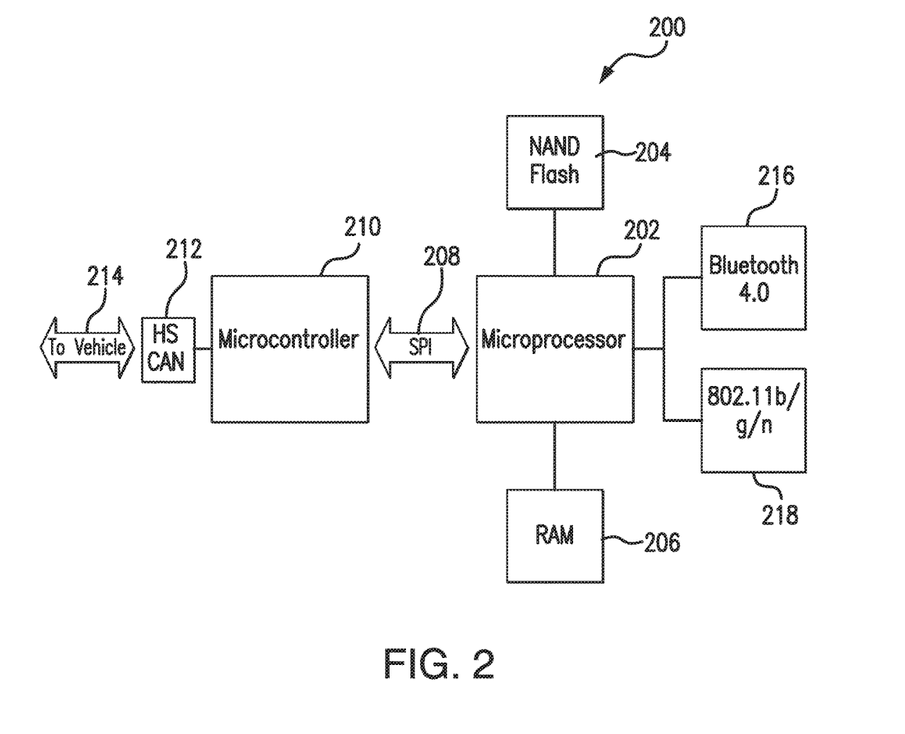
FIG. 2 is an exemplary block diagram of mobile polling device components in accordance with an illustrative embodiment.

Referring to FIG. 2, a schematic block diagram provides an overview of some components inside a mobile polling device in accordance with embodiments of the present disclosure. As noted above, the mobile polling device 106 is a specialized transceiver unit communicatively coupled to the vehicle 102, capable of accessing vehicle performance data, among other data, and capable of performing efficient compression for the storage and wireless transmission of acquired data. A mobile polling device 200 shown in FIG. 2 is similar to the mobile polling device 106 in FIG. 1, except that the mobile polling device 200 also illustrates and highlights selected internal components including one or more wireless communication modules 216 and 218, a head unit processor 202 with associated memory including a nonvolatile random access memory (RAM) 206 and a NAND flash memory 204, and a microcontroller 210. In one embodiment, the head unit processor 202 can be, for example, a Texas Instruments AM3703 Sitara ARM microprocessor while the microcontroller 210 can be any suitable CAN microcontroller. The NAND flash memory 204 may perform program, read, and erase operations according to the control of the head unit processor 202.

For the transmitting and receiving of data between various components, the head unit processor 202 can also be associated with serial peripheral interface (SPI) 208. For example, the head unit processor 202 may communicate, over SPI 208, with the microprocessor device 210. SPI 208 may comprise various components and may communicate with various signal paths. In an exemplary embodiment, the SPI 208 comprises shift registers for receiving and sending data via communication lines such as: Master In Slave Out and Master Out Slave In lines. The SPI 208 may further be configured to operate in either a master or slave mode.

As shown in FIG. 2, the mobile polling device 200 includes the microcontroller 210 that is connected to an interface 212. In one embodiment the interface 212 is a High Speed Control Area Network (HSCAN) interface. Controller Area Network (CAN) was designed for automotive applications needing high levels of data and data rates of up to 1 Mbit/s. Beginning with the 2008 model year and beyond, this industry standard is the only acceptable communication protocol. CAN messages have a specified structure dictated by CAN standards. CAN networks have rules for dealing with colliding messages when two modules begin transmitting messages at the same time. HSCAN 214 is classified as a Class C network for both vehicle network and diagnostic communication. It is noted that HSCAN network 214 may be connected to a specialized OBD port which connects to modern vehicle powertrain CAN bus. In other words, the mobile polling device 200 is configured to acquire a plurality of government mandated and many manufacturer specific performance parameters using HSCAN network 214.

The wireless communication modules 216, 218 enable wireless communications over a variety of standards, including, but not limited to, Cellular (e.g., GSM, CDMA, GPRS, LTE), 802.11 (e.g., WLAN), and short range (e.g., Bluetooth, infrared, RFID), for the delivery of acquired vehicle performance data to remote data resources (e.g., cloud-based platform 125). In the embodiment depicted in FIG. 2, a first wireless communication module 216 comprises a Bluetooth module and a second wireless communication module 218 comprises a WiFi module. Furthermore, alternative embodiments may have just one or more than two wireless communication modules.

The Bluetooth module 216 can include any suitable combinations of hardware for performing wireless communications with other Bluetooth enabled devices and allows an RF signal to be exchanged between the head unit processor 202 and other Bluetooth enabled devices. In some embodiments, the Bluetooth module 216 can perform such wireless communications according to Bluetooth Basic Rate/Enhanced Data Rate (BR/EDR) and/or Bluetooth Low Energy (LE) standards. For example, the Bluetooth module 216 can include suitable hardware for performing device discovery, connection establishment, and communication based on only Bluetooth LE (e.g., single mode operation). As another example, the Bluetooth module 216 can include suitable hardware for device discovery, connection establishment, and communication based on both Bluetooth BR/EDR and Bluetooth LE (e.g., dual mode operation). As still another example, the Bluetooth module 216 can include suitable hardware for device discovery, connection establishment, and communication based only on Bluetooth BR/EDR. The WiFi module 218 can include any suitable combinations of hardware for performing WiFi (e.g., IEEE 802.11 family standards) based communications with other WiFi enabled devices.

Figure 3:
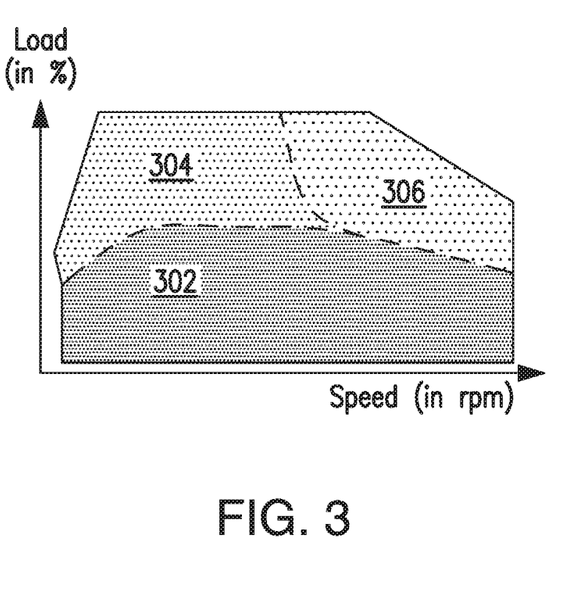
FIG. 3 is a graphical illustration of the operating region that could cause engine damaging severe knocking without the vehicle detuning the engine resulting in decreased power and fuel efficiency.

FIG. 3 is a graphical illustration of the operating region that could cause engine damaging severe knocking without the vehicle detuning the engine resulting in decreased power and fuel efficiency. It is well known that engine drive cycle conditions including load (measured in % of maximum), speed (measured in revolutions per minute), spark advance (measured in degrees before or after top dead center, i.e., BTDC or ATDC), ambient, intake manifold and exhaust manifold temperature and pressure, and other engine drive cycle conditions affect engine knock events. FIG. 3 illustrates the effect of two operating conditions (engine speed and engine load) on knocking events. A first region 302, where the engine encounters a low load, represents an uncritical operating region. A second region 304, where the engine is at low speed and high load, represents a knock prone region. A third region 306, where both engine load and engine speed are high, represents the operating region that can cause engine damaging severe knocking if the ECU does not detune the engine.

Figure 5:
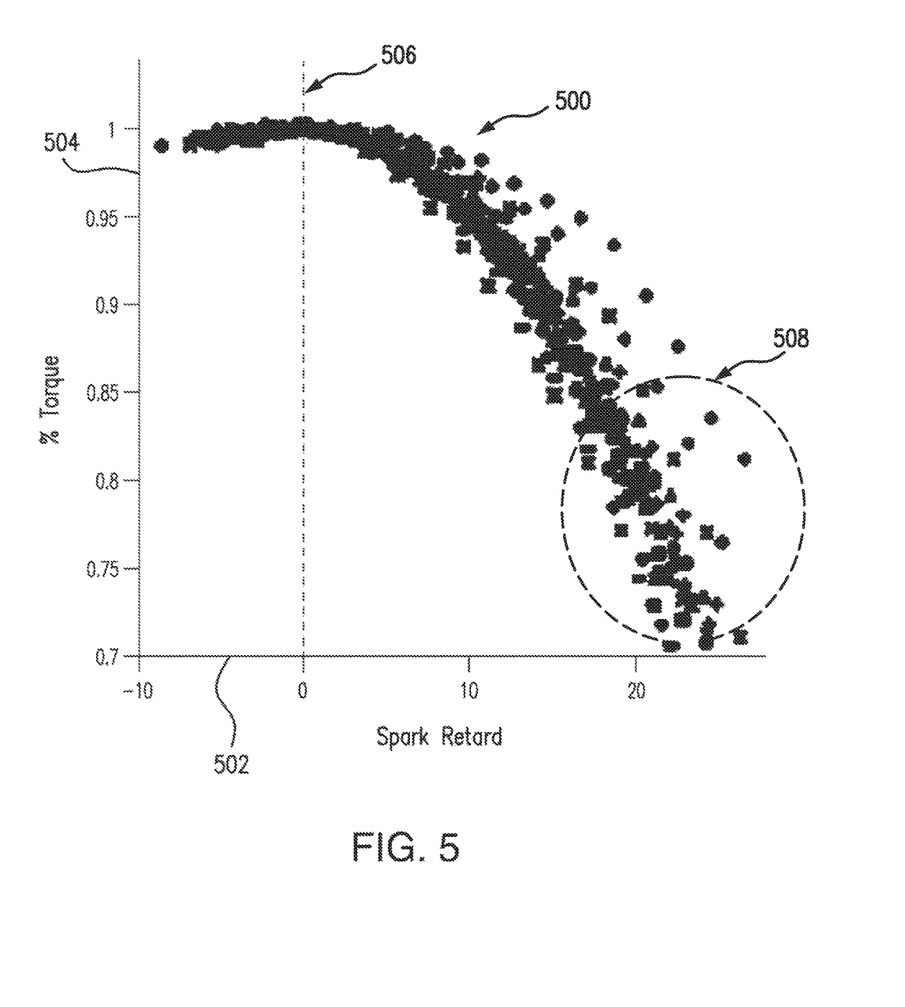
FIG. 5 graphically illustrates a method of estimating engine efficiency based on the integrated knock adaptation measurements, in accordance with an embodiment of the present disclosure.
Figure 6:
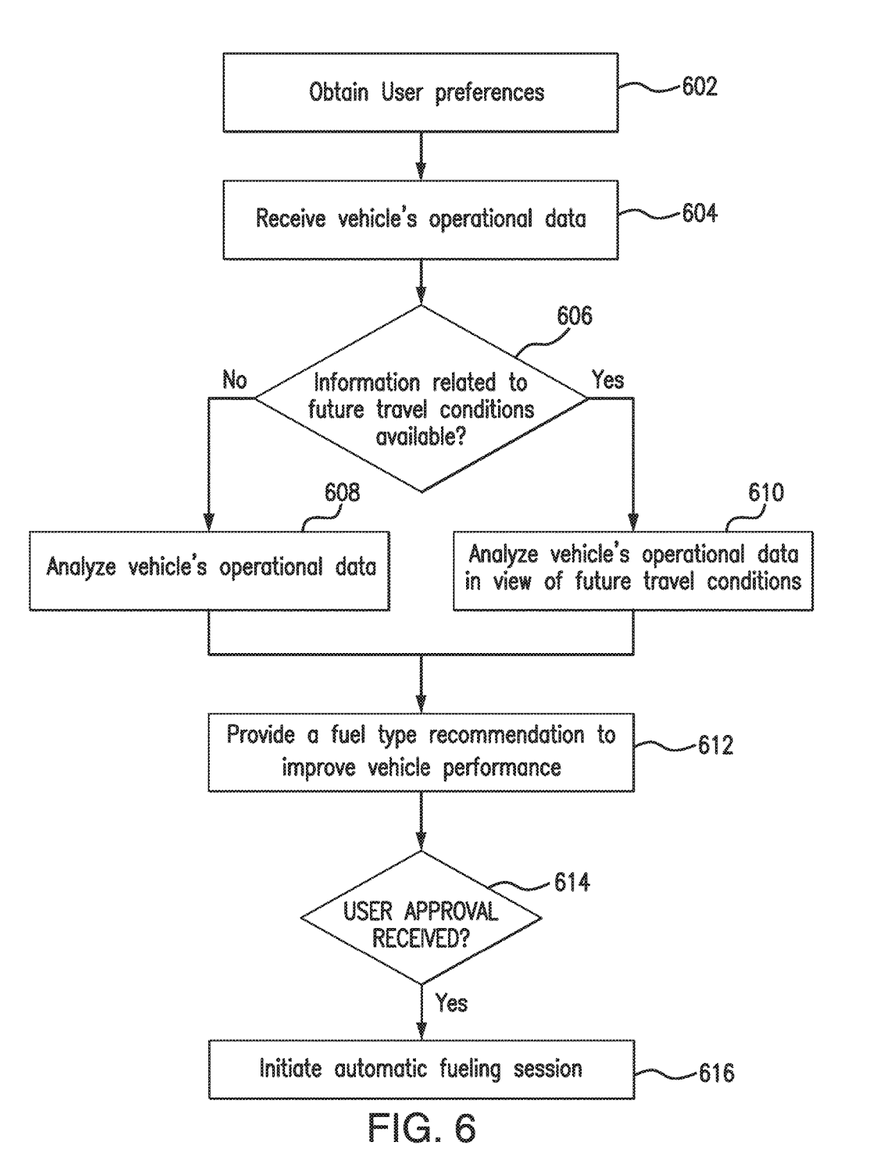
FIG. 6 is a flowchart of operational steps performed by the data analyzer module of FIG. 1 to provide customized fuel recommendations to users, in accordance with an illustrative embodiment of the present disclosure.

FIG. 6 is a flowchart of operational steps performed by the data analyzer module of FIG. 1 to provide customized fuel recommendations to users, in accordance with an illustrative embodiment of the present disclosure. Before turning to description of FIG. 6, it is noted that the flow diagram shown therein is described, by way of example, with reference to elements shown in FIGS. 1, 4A-4C and 5, although these operational steps may be carried out in any system and are not limited to the scenario shown in the aforementioned figures. Additionally, the flow diagram in FIG. 6 shows an example in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Initially, the data analyzer 114 obtains user preference information, responsive to the user logging into the system (as shown in step 602), the data analyzer 114 obtains user preference information. This can be achieved in any number of ways known in the art. For example, user preference may be inputted by the end user via the mobile application 109 running on the user computing device 108, e.g., by setting a menu item (such as a 'Vehicle performance preference' menu item) in the mobile application 109 in accordance with the user's preference. By utilizing this menu item, users may indicate whether they are interested in maximizing vehicle engine power output level (horsepower) under normal load, maximizing vehicle engine power output level under high load, maximizing the vehicle's fuel efficiency, and the like.

At 604, the data analyzer 114 may first load previously collected operational data associated with user's vehicle from the cloud-based database 112. The data analyzer 114 may process and list the trips recorded in the loaded collected operational data. Once the previously collected data is loaded, the data analyzer 114 may start receiving real-time vehicle operational data obtained periodically via the mobile polling device 106, as described above. In addition to the vehicle operational data, the data analyzer 114 may receive location and time information corresponding to the vehicle operational data in step 604. Vehicle location data and time may be received from the same sources as other vehicle operation data (i.e., cloud-based platform 125), but may be collected by different data sources. For example, the data analyzer 114 may receive the vehicle operational data from the cloud-based platform 125, and then may initiate communication with the vehicle's information and control system 104, mobile polling device's GPS system, or other systems to determine the location and time that correspond to the received vehicle operational data.

Various embodiments of the present disclosure contemplate that a user may desire fuel recommendations that take into account future travel conditions along a route to the destination. Examples of future travel conditions include loads at least substantially heavier than normal load (e.g., based on topography), driving at higher altitudes, and/or changing weather conditions that currently do not affect the route to the destination, but that will affect the route by the time the vehicle gets there. Implementations described herein may provide a user with enhanced fuel recommendations based on the future travel conditions.

Accordingly, at step 606, the data analyzer 114 may determine whether any additional information related to future travel conditions is available. This step can also be achieved in any number of ways known in the art. For example, future travel conditions may be inputted by the end user via the mobile application 109 running on the user computing device 108. Alternatively, the data analyzer 114 may obtain information user's destination and/or future trip from on-board GPS system or GPS application running on the user computing device 108. Furthermore, the cloud-based platform 125 may have multiple sources of data, such as topology, weather databases, traffic databases, elevation databases etc. The embodiments of the present disclosure also contemplate categorizing driving conditions of similar nature, thereby allowing performance of the vehicle at differing travel conditions to be grouped and compared. For example, segments of trips occurring on a similar road type can be grouped and evaluated. The road type may be determined by combining GPS data and separate databases showing the number of traffic lanes, exit and entrance points, etc. Alternatively, road types may be determined by the data analyzer 114 based on accumulated trip recorded time sensitive GPS and vehicle operational data, such a vehicle direction, speed, braking, and acceleration. Congested urban traffic conditions can be identified by time and location and categorized.

In response to determining that the information related to future travel conditions is not available (decision block 606, "No" branch), at step 608, the data analyzer 114 may analyze vehicle's operational data. In one embodiment, the vehicle performance data provided by the vehicle control system 104 may include engine efficiency value. The data analyzer 114 may compare the received engine efficiency value with known and predefined standards for all vehicles and those of the same make/model/year. In such embodiment, if the data analyzer 114 determines that there is no efficiency loss, the data analyzer 114 can make a recommendation to use a lower octane fuel. If the received engine efficiency value indicates efficiency loss under the current environmental and vehicle operating conditions, the data analyzer 114 makes a recommendation to upgrade to a higher octane in order to optimize the efficiency of the engine. This embodiment contemplates that all OEMs would be mandated to implement and provide engine efficiency value.

According to an alternative embodiment of the present disclosure, the analysis at step 608 may be performed by measuring knock adaptations of the engine in service as a function of vehicle operating conditions. These knock adaptations describe the spark retard associated with the ECUs efforts to inhibit knock events.

Figure 4A:
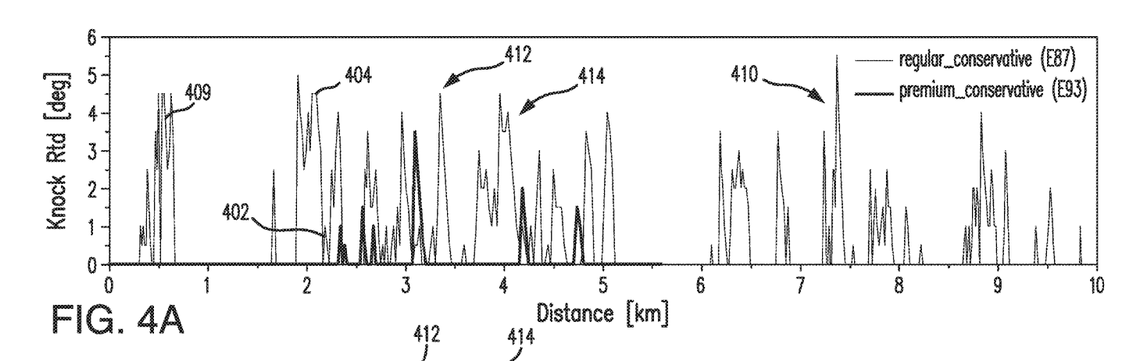
FIG. 4A is a graph illustrating knock retard measurements performed by the vehicle in a comparison of regular versus premium fuel.
Figures 4B, 4C:
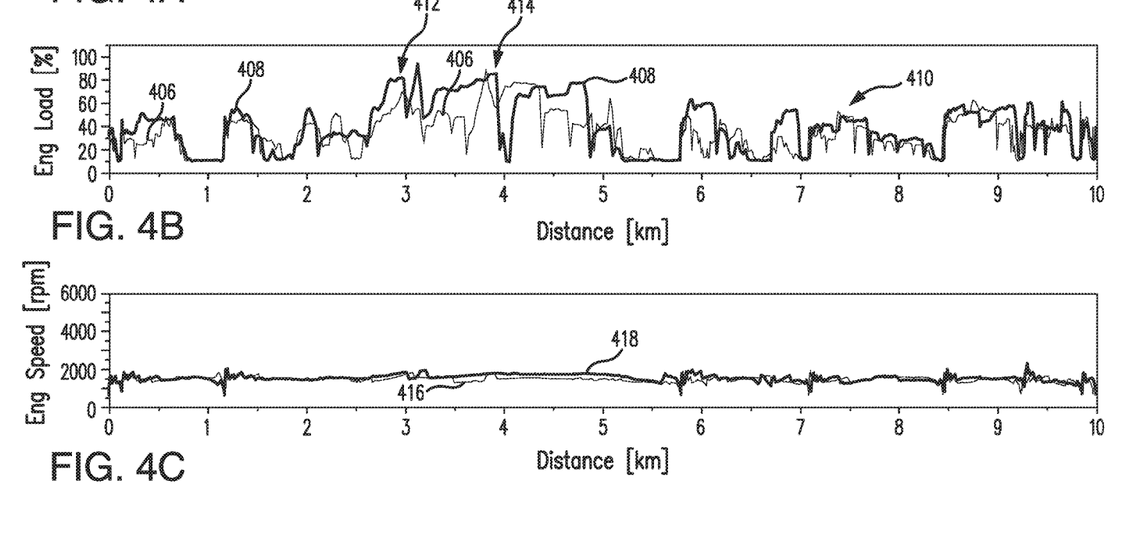
FIG. 4B is a graph illustrating engine load in a comparison of regular versus premium fuel.
FIG. 4C is a graph illustrating engine speed in a comparison of regular versus premium fuel.

Referring now to FIGS. 4A-4C and starting with FIG. 4A, there are shown two graphs illustrating a comparison of knock retards measured on substantially identical trips with the same drive cycle using regular and premium gasoline. First graph 402 illustrates knock retard measurements performed by the vehicle using premium fuel, while a second graph 404 shows knock retard measurements performed by the vehicle using regular fuel during substantially identical trips. It should be noted any knock retard measurement greater than zero degrees is less than optimal. In this example, when the regular fuel is used, the ignition timing is retarded much more often in order to suppress occurrence of knocking, as compared with the trip in which the premium fuel (high-octane fuel) is used. Two graphs 406 and 408 depicted in FIG. 4B show corresponding engine loads measured on the identical trips by the identical vehicle using the regular and premium fuels, respectively. Together, graphs 402-408 illustrate that spark timing is retarded at least several degrees due to insufficient octane levels during the more demanding periods of the trip (higher engine load), for example periods 410, 412 and 414, resulting in lower performance but suppression of knocking occurrences for the vehicle using regular fuel. Two graphs 416 and 418 shown in FIG. 4C illustrate engine speed measured on the identical trips by the identical vehicle using the regular and premium fuels, respectively. FIG. 4C illustrates substantially matching engine speeds for most periods of both trips.

FIG. 5 visually illustrates a method of estimating engine efficiency based on the integrated knock adaptation measurements in accordance with an embodiment of the present disclosure. The relationship between spark efficiency and engine performance is well understood in the automotive industry (see F. A. Ayala, M. D. Gerty, J. B. Heywood *Effects of combustion phasing, relative air fuel ratio, compression ratio, and load on SI engine efficiency*, SAE paper 2006-01-0229, Transactions, 115, J. Engines, Section 3 (2006), hereby incorporated by reference). In particular, the distribution curve 500 of FIG. 5 shows a change in engine efficiency (along the y-axis 504) at different spark retard measurements (along the x-axis 502) for a variety of vehicle types. Line 506 shows an efficiency line (or optimal efficiency) for the given operating conditions. The distribution curve 500 illustrates that performed spark retardations in the high load region 508 result in substantial degradation of engine performance. Thus, the integrated knock adaptations and other combustion characteristics can be used by the data analyzer 114 to derive engine efficiency from analysis of the obtained spark retardation measurements. For example, the data analyzer 114 may utilize the curve 500 showing relationship between the spark retard value and engine efficiency for a given vehicle to obtain more accurate estimates of engine efficiency.

In yet another embodiment, at step 608, the data analyzer 114 may analyze additional parameters included in vehicle's operational data to provide a recommendation. For example, the data analyzer 114 may generate a recommendation model based on a plurality of measured parameters. Furthermore, each of the plurality of measured parameters may include a scaling factor. In one embodiment, the recommendation model may be generated based on the following measured operational data parameters: engine speed, engine load, ambient and/or intake manifold air temperature and, optionally, coolant temperature. It is well understood in the automotive industry that the knock prone operating region (third region) 306 in FIG. 3 can be increased by dry, hot air entering the intake manifold and, to a lesser extent, the temperature of the engine. The intake manifold is responsible for the even distribution of the air/fuel mixture to each cylinder; the intake manifold also serves as a mount for fuel injectors (on modern engines). As noted above, the data analyzer 114 may assign weighting factors to the particular normalized measured operational data parameters of particular vehicle and powertrain based on knowledge of the knock prone operating regions for the particular type of engine. For instance, the data analyzer 114 may assign a higher weighting factor to knock prone operating ranges for the various operational data parameters. In other words, the weightages may be varied by the data analyzer 114 based on operating conditions. For example, at higher engine speeds, where knocking may be more prevalent, the engine speed may be given higher weighting factor. Furthermore, the recommendation model employed by the data analyzer 114 may utilize a normalization constant (for example, X) representing the OEM recommended fuel for average conditions. In one embodiment, the data analyzer 114 assigns a value of 50 to the normalization constant X, used as a multiplier of the weight adjusted vehicle operational parameters to put the final recommendation results on a convenient scale, as described in greater detail below.

The following illustrates exemplary analysis of obtained vehicle operational data measurements performed by the data analyzer 114 for three different vehicle operating scenarios. A first scenario illustrates calculations performed by the data analyzer 114 for a low severity trip comprising primarily low load segments. A second scenario illustrates calculations performed by the data analyzer 114 for a medium severity trip. In this case the same vehicle travels from the same origin to the same destination along the same route. However, in the second scenario the vehicle also pulls behind a trailer having approximate weight of 8000 lbs. A third scenario is similar to the second scenario, however, in this case, the vehicle pulls the trailer rather aggressively along the same route to illustrate the extreme range of operating conditions in the knock prone operating region 306 in FIG. 3. For simplicity of illustration and explanation, the analysis performed by the data analyzer 114 in step 608 is only based on obtained measurements of engine speed and engine load parameters in each scenario. It will be understood that the data analyzer 114 can take into consideration any number of obtained vehicle performance parameters, such as, but not limited to, intake air temperature, coolant temperature, and the like.

Tables 1 and 2 below set forth exemplary engine speed measurements and engine load measurement received by the data analyzer 114 in the first scenario:

TABLE 1

| Bin # | Engine Speed (RPM) | Count | Fraction |
|---|---|---|---|
| 1 | 0 | 267 | 0.33 |
| 2 | 1333 | 499 | 0.61 |
| 3 | 2666 | 51 | 0.06 |
| 4 | 4000 | 0 | 0.00 |
| 5 | 5330 | 0 | 0.00 |
| 6 | 6666 | 0 | 0.00 |
| 7 | 8000 | 0 | 0.00 |

TABLE 2

| Bin # | Engine Load (%) | Count | Fraction |
|---|---|---|---|
| 1 | 0 | 196 | 0.24 |
| 2 | 17 | 253 | 0.31 |
| 3 | 34 | 190 | 0.23 |
| 4 | 51 | 133 | 0.16 |
| 5 | 68 | 34 | 0.04 |
| 6 | 85 | 10 | 0.01 |
| 7 | 100 | 1 | 0.00 |

In the tables, bins (1-7) represent respective predefined ranges of operational data parameters values (i.e., engine speed), and may be said to "contain" the measurements having values within the ranges of the respective bins. For example, Bin 1 in Table 1 may represent a value range from 0 to 1333 RPMs, while Bin 2 in Table 1 may represent a value range from 1333 to 2666 RPMs. The count column indicates respective number of measurements corresponding to each predefined range and the fraction column indicates respective fractions of number of observed measurements for each range versus the total number (i.e., 817 for tables 1 and 2) of obtained measurements. As noted above, the data analyzer 114 may assign weighting factors to the particular normalized measured operational data parameters. For illustrative purposes only, assume that the data analyzer 114 assigns the following weighting factors to respective bin numbers in table 1 above: 0, 0, 5, 10, 11, 12, and 13 and assigns the following weighting factors to respective bin numbers in table 2 above: 0, 0.25, 0.5, 4, 6, 7, and 8. As noted above, the data analyzer 114 assigns higher weighting factors to knock prone operating ranges for the various operational data parameters.

According to an embodiment of the present disclosure, the step 608 may further involve calculations of weighted sums of normalized measurements (fraction values). Continuing with the data shown in tables 1 and 2, in this scenario, the data analyzer 114 determines that the weighted sum associated with the engine speed parameter is equal to 0*0.33+0*0.61+5*0.06+10*0.0+11*0.0+12*0.0+ 13*0.0=0.3. Similarly, the data analyzer 114 determines that the weighted sum associated with the engine load parameter is equal to 0*0.24+0.25*0.31+0.5*0.23+4*0.16+6*0.04+ 7*0.01+8*0.0=1.2.

Furthermore, according to an embodiment of the present disclosure, the step 608 may further involve calculations of RON correction scores for each trip. It is noted that the data analyzer 114 may also assign the weighting factors individually to each operational data parameter. For instance, in one embodiment, the data analyzer 114 may assign equal weighting factors (0.5) to the engine speed and engine load parameters. The RON correction scores can be determined by multiplying these weighting factors by weighted sums calculated above. In other words, the data analyzer 114 can determine the RON correction score for the first scenario by performing the following calculations: RON correction score=0.3*0.5+1.2*0.5=0.75.

Tables 3 and 4 below set forth exemplary engine speed measurements and engine load measurement received by the data analyzer 114 in the second scenario:

TABLE 3

| Bin # | Engine Speed (RPM) | Count | Fraction |
|---|---|---|---|
| 1 | 0 | 470 | 0.45 |
| 2 | 1333 | 431 | 0.41 |
| 3 | 2666 | 97 | 0.09 |
| 4 | 4000 | 37 | 0.04 |
| 5 | 5330 | 6 | 0.01 |
| 6 | 6666 | 0 | 0.00 |
| 7 | 8000 | 0 | 0.00 |

TABLE 4

| Bin # | Engine Load (%) | Count | Fraction |
|---|---|---|---|
| 1 | 0 | 194 | 0.19 |
| 2 | 17 | 380 | 0.37 |
| 3 | 34 | 180 | 0.17 |
| 4 | 51 | 128 | 0.12 |
| 5 | 68 | 79 | 0.08 |
| 6 | 85 | 35 | 0.03 |
| 7 | 100 | 45 | 0.04 |

According to an embodiment of the present disclosure, assuming that the data analyzer 114 uses the same weighting factors as above and continuing with the data shown in tables 3 and 4, in this scenario, the data analyzer 114 determines that the weighted sum associated with the engine speed parameter is equal to 0*0.45+0*0.41+5*0.09+10*0.04+11*0.01+12*0.0+13*0.0=0.96. Similarly, the data analyzer 114 determines that the weighted sum associated with the engine load parameter is equal to 0*0.19+0.25*0.37+0.5*0.17+4*0.12+6*0.08+7*0.03+8*0.04=1.67. As described above, the data analyzer 114 can determine the RON correction score for the second scenario by performing the following calculations: RON correction score=0.96*0.5+1.67*0.5=1.32.

Tables 5 and 6 below set forth exemplary engine speed measurements and engine load measurement received by the data analyzer 114 in the third scenario:

TABLE 5

| Bin # | Engine Speed (RPM) | Count | Fraction |
|---|---|---|---|
| 1 | 0 | 433 | 0.44 |
| 2 | 1333 | 301 | 0.30 |
| 3 | 2666 | 181 | 0.18 |
| 4 | 4000 | 75 | 0.08 |
| 5 | 5330 | 2 | 0.00 |
| 6 | 6666 | 0 | 0.00 |
| 7 | 8000 | 0 | 0.00 |

TABLE 6

| Bin # | Engine Load (%) | Count | Fraction |
|---|---|---|---|
| 1 | 0 | 223 | 0.22 |
| 2 | 17 | 335 | 0.34 |
| 3 | 34 | 124 | 0.13 |
| 4 | 51 | 41 | 0.04 |
| 5 | 68 | 29 | 0.03 |
| 6 | 85 | 63 | 0.06 |
| 7 | 100 | 177 | 0.18 |

According to an embodiment of the present disclosure, assuming that the data analyzer 114 uses the same weighting factors as above and continuing with the data shown in tables 5 and 6, in this scenario, the data analyzer 114 determines that the weighted sum associated with the engine speed parameter is equal to 0*0.44+0*0.30+5*0.18+10*0.08+11*0.00+12*0.0+13*0.0=1.7. Similarly, the data analyzer 114 determines that the weighted sum associated with the engine load parameter is equal to 0*0.22+0.25*0.34+0.5*0.13+4*0.04+6*0.03+7*0.06+8*0.18=2.35. As described above, the data analyzer 114 can determine the RON correction score for the third scenario by performing the following calculations: RON correction score=1.7*0.5+2.35*0.5=2.03.

Referring back to FIG. 6 now, in response to determining that the information related to future travel conditions is available (decision block 606, "Yes" branch), at step 610, the data analyzer 114 may analyze vehicle's operational data taking into consideration detailed information associated with the future travel conditions. Such detailed future travel information could include, without limitations, expected topographical changes, expected cargo and/or trailer weight and weather forecasts. For example, if the data analyzer 114 determines (based on the provided weather forecast) that the vehicle would be travelling to a hotter, dryer, or colder climate or that for the next segment of the trip the vehicle would be operating under heavier/lighter than normal load, the data analyzer 114 may be configured to adjust calculations (e.g., weighting factors) accordingly.

Next, at 612, the data analyzer 114 may provide a fuel type recommendation based on the analysis performed at steps 608 or 610. In one embodiment, if the analysis step simply involved evaluation of the engine efficiency value provided by the vehicle control system 104 and if the data analyzer 114 determines that there is no efficiency loss, the data analyzer 114 can make a recommendation to use a lower octane (more knock prone) fuel as long as the lower octane fuel is above the minimum required by the manufacturer for the vehicle. If the received engine efficiency value indicates efficiency loss under the current environmental and vehicle operating conditions, the data analyzer 114 makes a recommendation to upgrade to a higher octane in order to optimize the efficiency of the engine. Similar approach with respect to providing fuel type recommendations may be employed by the data analyzer 114 if the engine efficiency was estimated using the relationship between spark efficiency and engine performance, as described above in conjunction with FIGS. 4A-4C and 5.

In yet another embodiment, at step 612, the data analyzer 114 may use the RON correction scores generated by the recommendation model based on a plurality of measured parameters as a scoring basis for making a decision regarding a proper fuel type recommendation. As noted above, fuel types typically must meet a minimum octane posted at the pump, typically (RON+MON/2) of 87 octane for "regular"

fuel and 91 to 93 octane for a "premium" fuel. In many regions, refiners may offer a "mid-grade" gasoline having octane and additive packages placing the quality of the gasoline somewhere between regular and premium fuel types. A typical octane for a mid-grade fuel is about 89 octane.

In one embodiment, the data analyzer 114 multiplies the generated RON correction scores by the scalar constant X defined above to determine a fuel type recommendation. In one embodiment, assuming the vehicle 102 currently uses the "regular" fuel, the data analyzer 114 may derive the recommendation by the following logic:

If (X*RON correction score≥100) recommend a two-step upgrade (from 87 octane to 93 octane);

If (80≤X*RON correction score<100) recommend a one-step upgrade (from 87 octane to 89 octane);

If (35≤X*RON correction score<80) recommend current fuel grade;

If (X*RON correction score<35) recommend to downgrade if not below OEM requirement.

Again, the three cases (scenarios) mentioned above are employed to illustrate different recommendations based on the generated RON correction scores. In the first scenario the RON correction score value equal to 0.75 was generated based on the obtained data shown in Tables 1 and 2. Since X*RON correction score=50*0.75=37.5, the data analyzer 114 provides a recommendation to remain with the current fuel grade in this scenario. In the second scenario, the RON correction score value equal to 1.32 was generated based on the obtained data shown in Tables 3 and 4. Since X*RON correction score evaluates to 66, the data analyzer 114 recommends to remain with the current fuel grade in this scenario as well. It is noted that even though the overall recommendation provided by the data analyzer 114 is the same in both scenarios, such recommendation might change if the data analyzer 114 takes into account future travel conditions in step 610. For example, if the data analyzer 114 determines that the vehicle would be travelling to a hotter or colder climate or that for the next junction of the trip the vehicle would be operating under heavier/lighter than normal load, the data analyzer 114 may be configured to adjust calculations (e.g., weighting factors) accordingly. Referring now to the third scenario above, the RON correction score value equal to 2.03 was generated based on the obtained data shown in Tables 5 and 6. Since X*RON correction score evaluates to 101.5, the data analyzer 114 recommends the two step upgrade in this scenario.

The embodiments described above illustrate how the data analyzer 114 may provide summarized, averaged recommendations. In general, some vehicles spend the majority of their time on limited access roads operating at high, sustained speeds. Other vehicles experience a greater percentage of suburban or urban driving conditions. However, almost any trip (drive cycle) is likely to include segments having different severities. The benefits of a particular fuel type under different load, traffic, and road and weather conditions can also be evaluated by the data analyzer 114. For example, higher octane fuel would be of benefit to vehicles during long uphill travel, carrying heavy cargo, or towing a trailer, but not on cool flat roadways. As another example, vehicles driving in hot dry areas (e.g., across a dessert) would benefit from higher octane rating gasoline, even though the roadways are flat. Accordingly, in one embodiment, the data analyzer 114 having access to data related to future travel conditions, especially for long haul travel, may analyze in step 610 different segments of the upcoming trip and provide fuel recommendation for each specific segment. For instance, a vehicle travelling from New York to Atlanta needs to be refueled multiple times. In one embodiment, the data analyzer 114 may dynamically analyze vehicle's current and/or historic operational data, traffic, road and weather conditions in order to provide recommendations for each segment of the trip (i.e., segments between refueling stops) based on user preferences (i.e., vehicle performance, fuel efficiency, etc.). In various embodiments, the recommendations provided by the data analyzer 114 may inform the users of how different types of fuel or how changing driving habits would affect specific segments of the trip. Additionally, travel to high altitudes with decreased pressure affect knocking conditions and overall power levels. Adjusting fuel recommendation to restore power at these conditions is possible using these same methods.

In one embodiment, at step 612, the data analyzer 114 may provide more than one fuel recommendation for each trip segment. For example, the provided recommendation may indicate a "minimum" recommended fuel, an "average" recommended fuel and a "peak" recommended fuel type. These recommendations enable the user to choose whether he/she would sacrifice some performance over certain segments of the typical or expected trip or whether he/she would like to ensure peak performance at all segments of the trip (drive cycle). In one embodiment, the data analyzer 114 may quantify performance improvements/deteriorations. For example, the expected performance gains or setbacks could be expressed by the data analyzer 114 in terms of efficiency or peak power over the expected affected segments of the trip/drive cycle. Further, analysis of the detailed travel conditions associated with the expected trip (step 610) enhances fuel recommendations provided by the data analyzer 114. A vehicle expected to travel along a next segment characterized by low speed and higher load (i.e., when climbing a long hill at low speed) may benefit from the one step fuel upgrade, while another vehicle carrying similar or even greater weight but expected to travel along an easier segment (with respect to terrain, road and/or weather conditions) may not need such a fuel upgrade. In yet another embodiment, along with the recommended fuel type, at step 612, the data analyzer 114 may indicate the time interval at which gained benefits can be expected from the fuel upgrade and the estimated quantification of such benefit (i.e., estimated improved power output and/or engine efficiency).

In various embodiments, step 612 may further involve the data analyzer 114 transmitting the recommendation to the user computing device 108. In response to receiving such recommendation, the mobile application 109 may display the recommendation to the user via a Graphical User Interface (GUI), for example.

As was described in greater detail above, the fuel recommendation system 100 may optionally include the smart fuel dispenser 116 that may be communicatively coupled to the data analyzer 114 via the cloud-based platform 125. In such embodiment, the mobile application 109 may additionally solicit user's approval of the recommended fuel type. If such approval is received from the user, the mobile application 109 may send the fuel type approval back to the data analyzer 114. Referring back to FIG. 6, in response to receiving such user approval (decision block 614, "yes" branch), according to an embodiment of the present disclosure, at step 616, the data analyzer 114 may provide one or more operational commands to the fuel dispenser 116 to initiate an automatic fueling session involving the recommended fuel type. In some implementations the data analyzer 114 may communicate with the fuel dispenser via a corresponding cloud-based facility controller (not shown in FIG. 1). Such facility controller may, for example, provide authorization, financial transaction, and fuel dispensing management for one or more fuel dispensers 116.

The techniques described herein, improve the customer experience and facilitate prevention of damage to vehicles. Moreover, using the telematics data from a customer's vehicle, various fuel related recommendations or enhancements can be provided to the customer, as discussed above.

PCT/EP Clauses:

1. A system for providing fuel type recommendations comprising a mobile polling device communicatively coupled to one or more computing devices integrated with a vehicle for receiving vehicle's operational data from the vehicle's computing devices; and at least one processor adapted to execute one or more processes, the processor when executing the one or more processes, is operable to: receive vehicle's operational data from the mobile polling device; analyze the received vehicle's operational data to identify recommended fuel type; and provide one or more fuel type recommendations indicative of the recommended fuel type.

2. The system for providing fuel type recommendations according to clause 1, wherein the processor is a component of a cloud-based computing environment.

3. The system for providing fuel type recommendations according to clause 1 or 2, wherein the processor is a component of the one or more computing devices integrated with the vehicle.

4. The system for providing fuel type recommendations according to any of clauses 1-3, wherein the processor is a component of a mobile device associated with the vehicle.

5. The system for providing fuel type recommendations according to any of clauses 1-4, wherein the processor is further operable to present the one or more fuel type recommendations to the driver using a Graphical User Interface (GUI).

6. The system for providing fuel type recommendations according to any of clauses 1-5, wherein the vehicle's operational data includes at least environmental data, driving conditions and usage conditions for a current trip travelled by the vehicle or an intended trip to be travelled by the vehicle.

7. The system for providing fuel type recommendations according to any of clauses 1-6, wherein the identified recommended fuel type is determined based on driver's preference and characterized in that the driver's preference includes at least one of: maximizing vehicle engine power output level under normal load, maximizing vehicle engine power output level under high load, maximizing the vehicle's fuel efficiency, minimizing vehicle's emissions and minimizing wear on the vehicle.

8. The system for providing fuel type recommendations according to any of clauses 1-7, wherein the processor that is operable to analyze the vehicle's operational data is further operable to analyze one or more control measures initiated by vehicle's knock control system in order to cease an engine knocking condition.

9. The system for providing fuel type recommendations according to any of clauses 1-8, wherein the mobile polling device is operable to establish a wireless connection with an on-board diagnostic (OBD) connector of the vehicle and operable to receive the vehicle's operational data using the wireless connection.

10. The system for providing fuel type recommendations according to any of clauses 1-9, wherein the processor operable to analyze the vehicle's operational data is further operable to compare the vehicle's operational data to predefined standards.

11. The system for providing fuel type recommendations according to any of clauses 1-10, wherein the processor is further operable to obtain information related to future travel conditions of the vehicle and to identify recommended fuel type based on the information related to future travel conditions of the vehicle.

12. The system for providing fuel type recommendations according to any of clauses 1-11, wherein the processor operable to analyze the vehicle's operational data is further operable to identify the recommended fuel type based on the relationship between spark retard values and engine efficiency values.

13. The system for providing fuel type recommendations according to any of clauses 1-12, wherein the processor operable to analyze the vehicle's operational data is further operable to calculate weighted sums of associated operational data parameters.

14. The system for providing fuel type recommendations according to clause 13, characterized in that the associated data parameters include at least engine speed and engine load.

15. The system for providing fuel type recommendations according to clause 1 or 2, further having a fuel dispensing station communicatively coupled to the cloud-based computing environment, wherein the processor is further operable to send instructions to the fueling dispensing station to dispense the recommended fuel type into the vehicle, in response to receiving approval of the recommended fuel type from the driver of the vehicle.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for providing fuel type recommendations, the system comprising:
   a mobile polling device communicatively coupled to one or more computing devices integrated with a vehicle for receiving vehicle's operational data from the vehicle's computing devices; and
   a processor adapted to execute one or more processes, the processor when executing the one or more processes, is operable to:
      receive vehicle's operational data from the mobile polling device;
      analyze the received vehicle's operational data to identify recommended fuel type; and
      provide one or more fuel type recommendations indicative of the recommended fuel type; and
   a smart fuel dispenser communicatively coupled to the processor wherein the processor provides authorization and financial transaction for the smart fuel dispenser.

2. The system as recited in claim 1, wherein the processor is a component of a cloud-based computing environment.

3. The system as recited in claim 1, wherein the processor is a component of the one or more computing devices integrated with the vehicle.

4. The system as recited in claim 1, wherein the processor is a component of a mobile device associated with the vehicle.

5. The system as recited in claim 4, wherein the mobile device solicits user's approval of the recommended fuel type.

6. The system as recited in claim 1, wherein the vehicle's operational data includes at least environmental data, driving conditions and usage conditions for a current trip travelled by the vehicle or an intended trip to be travelled by the vehicle.

7. The system as recited in claim 1, wherein the identified recommended fuel type is determined based on driver's preference and wherein the driver's preference comprises at least one of: maximizing vehicle engine power output level under normal load, maximizing vehicle engine power output level under high load, maximizing the vehicle's fuel efficiency, minimizing vehicle's emissions and minimizing wear on the vehicle.

8. The system as recited in claim 1, wherein the processor operable to analyze the vehicle's operational data is further operable to analyze one or more control measures initiated by vehicle's knock control system in order to cease an engine knocking condition.

9. The system as recited in claim 1, wherein the mobile polling device is operable to establish a wireless connection with an on-board diagnostic (OBD) connector of the vehicle and operable to receive the vehicle's operational data using the wireless connection.

10. The system as recited in claim 1, wherein the processor operable to analyze the vehicle's operational data is further operable to compare the vehicle's operational data to predefined standards.

11. The system as recited in claim 1, wherein the processor is further operable to obtain information related to future travel conditions of the vehicle and to identify recommended fuel type based on the information related to future travel conditions of the vehicle.

12. The system as recited in claim 1, wherein the processor operable to analyze the vehicle's operational data is further operable to identify the recommended fuel type based on the relationship between spark retard values and engine efficiency values.

13. The system as recited in claim 1, wherein the processor operable to analyze the vehicle's operational data is further operable to calculate weighted sums of associated operational data parameters.

14. The system as recited in claim 13, wherein the associated data parameters include at least engine speed and engine load.

15. The system as recited in claim 2, further comprising a fuel dispensing station communicatively coupled to the cloud-based computing environment, wherein the processor is further operable to send instructions to the fueling dispensing station to dispense the recommended fuel type into the vehicle, in response to receiving approval of the recommended fuel type from the driver of the vehicle.

16. The system as recited in claim 1, wherein the one or more fuel type recommendations specify benefits of the identified optimal fuel type.

17. A method for providing fuel type recommendations, the method comprising:
   receiving on a processor vehicle's operational data from one or more computing devices integrated with a vehicle;
   analyzing via the processor the received vehicle's operational data to identify recommended fuel type;
   providing via the processor one or more fuel type recommendations indicative of the recommended fuel type to a driver of the vehicle; and
   automatically dispensing via a smart fuel dispenser the recommended fuel type into the vehicle responsive to receiving driver's approval of the recommended fuel type,
      wherein the smart fuel dispenser is communicatively coupled with the processor and wherein the processor provides authorization and financial transaction for the smart fuel dispenser.

18. The method as recited in claim 17, wherein analyzing the received vehicle's operational data further comprises analyzing one or more control measures initiated by vehicle's knock control system in order to cease an engine knocking condition.

19. The method as recited in claim 17, wherein the vehicle's operational data includes at least environmental data, driving conditions and usage conditions for a current trip travelled by the vehicle or an intended trip to be travelled by the vehicle.

20. A system for providing fuel type recommendations, the system comprising:
   a mobile polling device communicatively coupled to one or more computing devices integrated with a vehicle for receiving vehicle's operational data from the vehicle's computing devices; and
   a processor adapted to execute one or more processes, the processor when executing the one or more processes, is operable to:
      receive vehicle's operational data from the mobile polling device;
      analyze the received vehicle's operational data to identify recommended fuel type; and
      provide one or more fuel type recommendations indicative of the recommended fuel type;
   an independent user computing device communicatively coupled to the mobile polling device and the processor, and
   a smart fuel dispenser communicatively coupled to the processor wherein the processor provides authorization and financial transaction for the smart fuel dispenser.

* * * * *